United States Patent [19]

Thompson et al.

[11] 3,769,496

[45] Oct. 30, 1973

[54] DIGITAL PROCESSING SYSTEM

[75] Inventors: Alan M. Thompson, Rotherham; Clement V. Gregg, Huddersfield, both of England

[73] Assignee: Goulder Mikron Limited

[22] Filed: Mar. 6, 1972

[21] Appl. No.: 232,022

[30] Foreign Application Priority Data

Mar. 16, 1971 Great Britain .................... 7,041/71

[52] U.S. Cl. .......... 235/92 DM, 324/78 D, 328/44, 235/92 R, 235/92 EV, 235/92 CC, 235/156

[51] Int. Cl. ........................................ H03k 21/00

[58] Field of Search .................... 235/92 EV, 92 PL, 235/92 FQ, 92 CC, 92 DE, 92 DM, 150.3, 156; 328/44; 324/78 R, 78 D, 78 N

[56] References Cited

UNITED STATES PATENTS

| | | | |
|---|---|---|---|
| 3,626,162 | 12/1971 | Rhoades | 235/92 FQ |
| 2,951,986 | 9/1960 | Gordon | 235/92 FQ |
| 3,624,517 | 11/1971 | Kawasaki-Shi et al. | 328/44 X |
| 3,206,665 | 9/1965 | Burlingham | 328/44 |

*Primary Examiner*—Maynard R. Wilbur
*Assistant Examiner*—Joseph M. Thesz, Jr.
*Attorney*—Irvin S. Thompson et al.

[57] ABSTRACT

Digital processing systems are described for obtaining a quotient by dividing the pulse count of a source train of electrical pulses by a selected number having a non-integral portion, i.e., a portion .BCDE where the selected number is A.BCDE. In one embodiment, an output from an up-down counter for dividing by the integral number portion A. is monitored by a cascade arrangement of base or radix counters each of which has a selectively settable gate through which feedback pulses are applied to an up-counting input of the up-down counter, the gates being set according to the integers .BCDE in the non-integral portion of the selected number. Thus, the output from the up-down counter is regularly corrected to give the required quotient. In another embodiment, the output of the up-down counter is monitored by a pre-set register containing the integers of the non-integral number portion and an active register from which each overflow is applied to the up-counting input of the up-down counter. The active register enters and adds successively the contents of the pre-set register on the occurrence of each pulse at the output of the up-down counter. Practical applications, using either embodiment, are described, namely gear testing apparatus and a variable ratio transmission.

8 Claims, 4 Drawing Figures

DIGITAL PROCESSING SYSTEM

This invention relates to a digital processing system. According to the present invention there is provided a digital processing system for dividing an average numerical count $x$ of a source train of pulses by a number having an integral portion and a non-integral portion which number can be expressed as $A + B/r^1 + C/r^2 + \ldots$ etc., where A represents the said integral portion and B, C, . . . etc. represent separate digits and $r$ is the base or radix of the number system; comprising a reversible counter having forward and reverse inputs and an output and adapted to pass one pulse to said output in response to A pulses applied to either of said inputs, and means defining a pulse feed-back path between said output and one of said inputs, said feed-back path means including counting means capable of passing to said one input B pulses in response to $r^1$ pulses appearing at said output + C pulses in response to $r^2$ pulses appearing at said output + . . . etc., whereby when a source train of pulses of count $x$ is applied to the other of said inputs the average pulse count appearing at said output is the quotient obtained by dividing $x$ by $A + B/r^1 + C/r^2 + \ldots$ etc.

Further, according to the present invention, there is provided, in combination, means capable of producing a source train of pulses, and a digital processing system as aforesaid.

Still further, according to the present invention, there is provided, in combination, means capable of producing a source train of pulses, a digital processing system as aforesaid, and means constituting a digital-to-analogue converter associated with the output train of pulses.

The source train of pulses may be a continuous train in the sense that for a given period fo time the numerical count is large compared with the time interval between adjacent pulses, the actual numerical count being of little or no importance. In such a case, the output train of pulses would also be continuous and the significant parameters would be the frequencies of the two trains of pulses.

Alternatively, the actual numerical count of the source pulses may constitute or represent a predetermined specific value, in which case the actual numerical count of the output pulses would constitute the quotient or a close approximation to the quotient obtained by dividing as aforesaid.

The source pulses do not necessarily have to be evenly spaced.

A digital processing system in accordance with the present invention is applicable to any number system wherein a selected number is capable of expression in the form:

A. BCDE -----

$$= A + B/r^1 + C/r^2 + D/r^3 + E/r^4 + ---$$

where $r$ is the base or radix of the number system,

A is the integral portion of the selected number, and B, C, D, E etc. are different numerical digits, .BCDE -- constituting the non-integral portion of the selected number.

It will be understood that the numerical digits in the nonintegral portion of the selected number need not necessarily be different.

Electronic, fluidic, mechanical, electro-mechanical and other comparable computing techniques may be used in carrying out the present invention.

Before proceeding to sepcific examples of digital processing systems embodying the present invention, the following is given by way of explanation.

Let $x$ = the average numerical count of a source train of pulses;

$r$ = the base or radix of a proposed number system;

A = the integral portion of a selected number; and

.BC ---- = the non-integral portion of the selected number.

The selected number = A. BC -----

$$= A + B/r^1 + C/r^2 + \text{-----}$$

$$\text{The desired quotient} = \frac{x}{A+\frac{B}{r^1}+\frac{C}{r^2}\cdots}$$

A pulse counter adapted to divide $x$ by A would produce the quotient $x/A$. This quotient exceeds the desired quotient by the difference:

$$\frac{x}{A}-\frac{x}{A+\frac{B}{r^1}+\frac{C}{r_2}\cdots}$$

$$=\left[\frac{\frac{B}{r^1}+\frac{C}{r^2}+\cdots}{A}\right] X \left[\frac{x}{A+\frac{B}{r^1}+\frac{C}{r^2}+\cdots}\right]$$

If the counter is provided with a reversible facility, then the desired quotient can be obtained by feedback to the reverse input of a number of pulses equal to the said difference multiplied by A, namely $$[A] X \left[\frac{\frac{B}{r^1}+\frac{C}{r^2}+\cdots}{A}\right] X \left[\frac{x}{A+\frac{B}{r^1}+\frac{C}{r^2}+\cdots}\right]$$

$$=\frac{B}{r^1}+\frac{C}{r^2}+\cdots X \text{ desired quotient.}$$

Thus, for the output pulse count to equal the desired quotient, the number of pulses fed back can be stated as:

B pulses for $r^1$

+ C pulses for $r^2$

+ --------- etc.

Thus, the number of pulses fed to the reverse input is determined by the non-integral portion of the selected number.

The foregoing considers only the value of average numerical counts of source and output pulses. Since the desired quotient is to be obtained by a principle which may be described as "correction by feedback," it can be understood that certain "instantaneous" counts of output pulses, i.e., certain "instantaneous" quotients, will be in error to a degree depending upon the manner in which feed-back is brought about, the magnitude of the value $x$, and, if a time factor is introduced so as to bring in a concept of frequency, the regularity or regulation of the feed-back pulses with respect to time.

Embodiments of the present invention will now be described, by way of example, with reference to the accompanying drawings in which.

Figure 1:
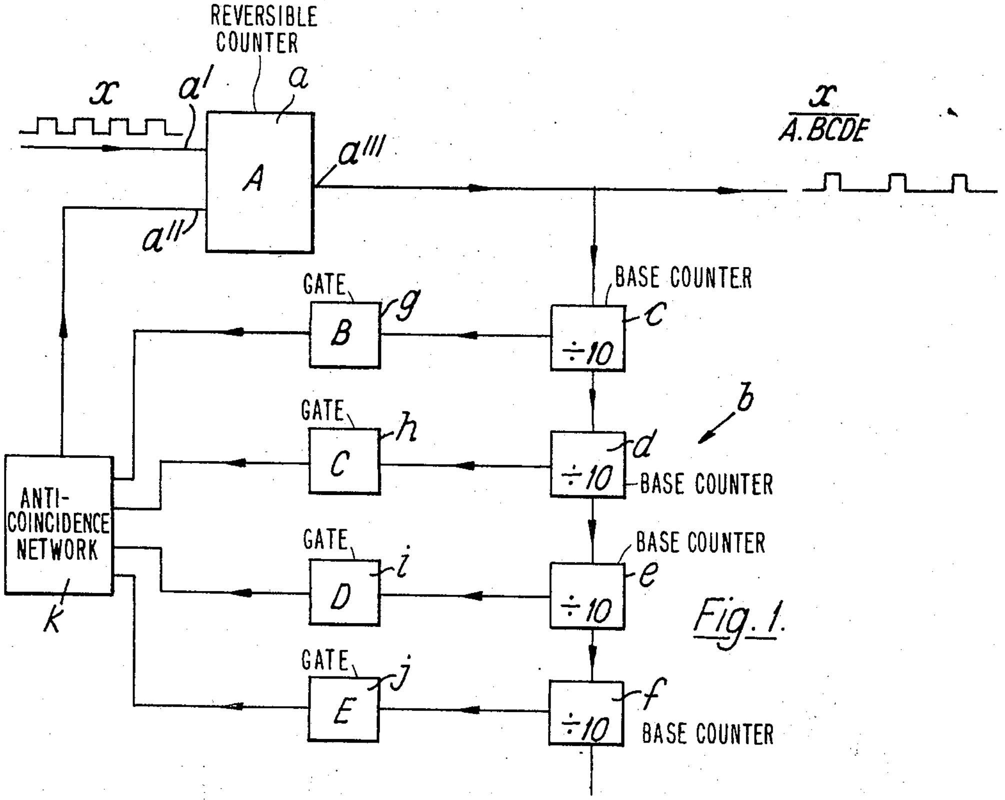
FIG. 1 is a schematic diagram of one embodiment of a digital processing system in accordance with the present invention.

In FIG. 1 of the drawings, a digital processing system in accordance with the present invention consists of an electronic reversible or up-down counter *a* and counting means indicated generally at *b* and consisting of four base or radix counters *c*, *d*, *e* and *f* with which are associated, respectively, four selective monitoring gates *g*, *h*, *i* and *j*. The up-down counter *a* has a down-counting input $a'$, an up-counting input $a''$, and an output $a'''$. Each of the counters *c*, *d*, *e* and *f* has a number of different states equal to the base or radix of the number system being used. In the present case a decimal system is used so that each base counter has 10 different states. The base counters are arranged in cascade and each puts out one pulse per cycle of ten input pulses. Thus, sequential division by 10 is achieved whereby counters *c*, *d*, *e* and *f* are, respectively, associated with the decimal integers or digits of a selected number in the form A. BCDE, or:

$$A + B/10^1 + C/10^2 + D/10^3 + E/10^4$$

The monitoring gates *g*, *h*, *i* and *j* are adapted so as to be capable of giving out, respectively, a number of pulses per cycle of each associated counter (*c*, *d*, *e* and *f*) equal to the value of the appropriate integer or digit B, C, D or E. Each monitoring gate may be pre-set, by means of a selector switch (not shown), to any value between and including zero and 9. Thus, with respect to the number of pulses appearing on line $a'''$, the total of pulses fed back to line $a''$, will be:

B pulses for $10^1$ on line $a'''$
+ C pulses for $10^2$ on line $a'''$
+ D pulses for $10^3$ on line $a'''$
+ E pulses for $10^4$ on line $a'''$ The feedback pulses to line $a''$ are routed through a device *k* for converting simultaneously-occurring pulses from the monitoring gates *g*, *h*, *i* and *j* to sequentially-occurring pulses in order to reduce error. The device *k* may also be adapted to ensure that feedback pulses on line $a''$ occur in the time intervals between source pulses on line $a'$.

In order to minimise "instantaneous" error, the pattern or regulation of feedback pulses is preferably in accordance with, or generally similar to, the arrangement given in the following table.

| Integer set in Monitoring gate | Pulse numbers at input of base counter when monitoring gate feeds back a pulse |
|---|---|
| 0 | 0 |
| 1 | 4 |
| 2 | 2 6 |
| 3 | 2 4 6 |
| 4 | 2 4 6 8 |
| 5 | 1 3 5 7 9 |
| 6 | 1 3 4 5 7 9 |
| 7 | 1 2 3 5 6 7 9 |
| 8 | 1 2 3 4 5 6 7 9 |
| 9 | 1 2 3 4 5 6 7 8 9 |

For example, where a monitoring gate is set to the integer 3, a feedback pulse will be applied to line $a''$ on the second, fourth and sixth pulses into the associated base counter.

If a source train of pulses of numerical count $x$ is applied to line $a'$, i.e., to the down-counting input of counter *a*, and the latter is pre-set to any integral number A, that is the integral portion of the selected number A. BCDE, then the average numerical count of the output train of pulses on line $a'''$ will be the desired quotient expressed as:

$$\frac{x}{A+\frac{B}{10^1}+\frac{C}{10^2}+\frac{D}{10^3}+\frac{E}{10^4}}$$

This may be confirmed as follows:
After $10^4$ pulses on line $a'''$, the count of $x$ must be $10.^4A + 10.^3B + 10.^2C + 10^1D + E$ pulses. Division of this value of $x$ by the selected number A. BCDE gives the quotient $10^4$.

Figure 2:
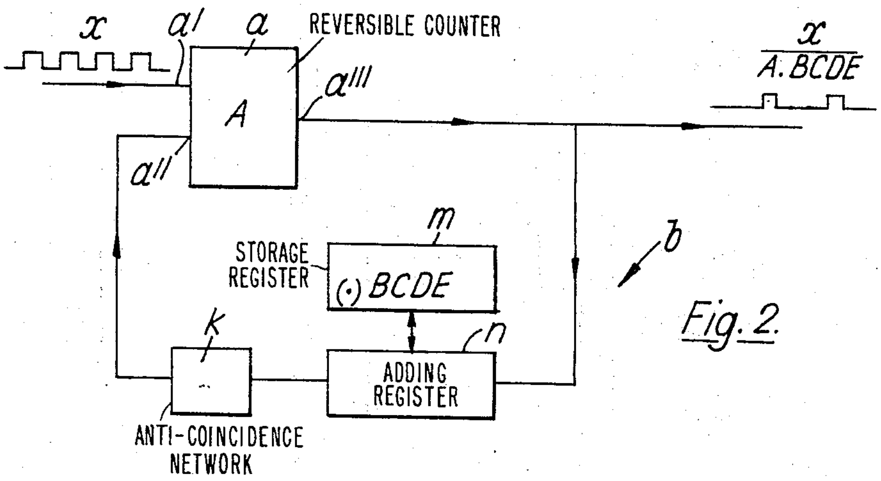
FIG. 2 is a schematic diagram of another embodiment of a digital processing system in accordance with the present invention.

In FIG. 2 of the drawings, the same reference letters are used to indicate parts which correspond with parts in FIG. 1. In this embodiment, the monitoring means *b* consists of a storage or preset register *m* containing the integers B, C, D and E, and an initially empty or blank adding register *n* adapted to enter and successively to add the contents of the register *m* on the first and subsequent pulses on line $a'''$. The register *n* is also adapted to apply one pulse by way of feedback on line $a''$ on each occurrence of an "overflow" in register *n*. It can be determined that the number of feedback pulses thus provided is:

B pulses for $10^1$ pulses on line $a'''$
+ C pulses for $10^2$ pulses on line $a'''$
+ D pulses for $10^3$ pulses on line $a'''$
+ E pulses for $10^4$ pulses on line $a'''$ Thus, for a source train of pulses of numerical count $x$ applied at $a'$, an output train of pulses of average numerical count $x$/A. BCDE, i.e., the desired quotient, is obtained on line $a'''$. In this embodiment, the pattern or regularity of the feedback pulses is determined by the summing characteristics of the particular integers or digits used in the places designated by B, C, D and E.

In both the FIG. 1 and FIG. 2 embodiments, it will be understood that the number of integers in the non-integral portion of the selected number is limited only by practical considerations.

Each of the above-described embodiments provides a means of dividing continuously a pulse train by a non-integral number. This is advantageous over previous proposals incorporating electronic multipliers and dividers in that division by a selected number having a larger number of integers than hitherto can be achieved without approaching operating frequencies beyond the capability of available electronic devices.

Figure 3:
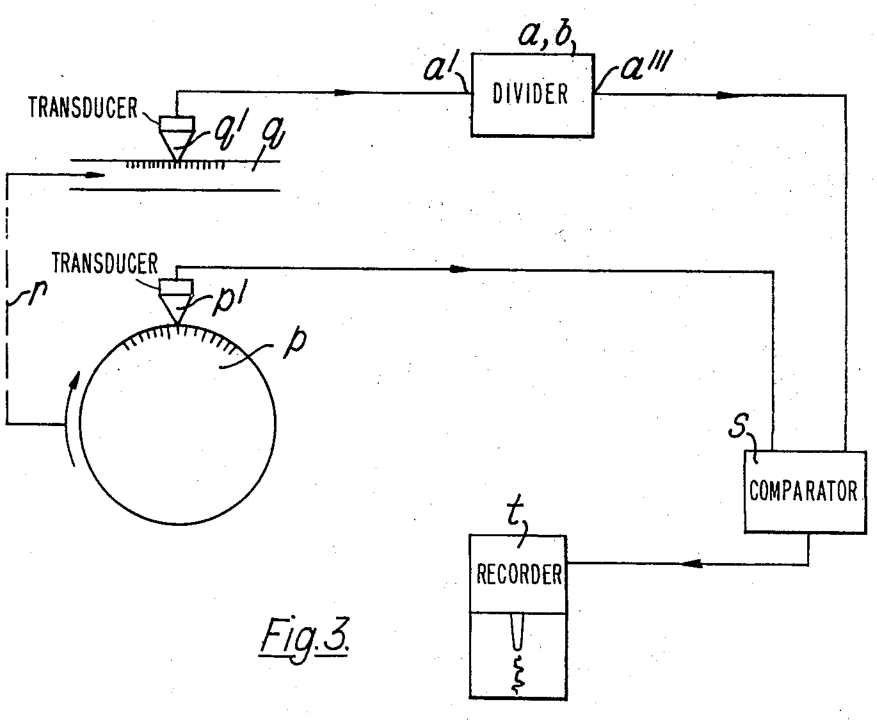
FIG. 3 is a schematic diagram of part of a toothed gear testing machine incorporating a digital processing system in accordance with the present invention.

In FIG. 3 of the drawings, a gear (not shown) to be tested is mounted co-axially and for rotation with a circular optical grating *p*.

A linear slide (not shown) carries a probe (not shown) and a linear optical grating *q*. The probe and the gear engage mechanically as represented by broken line *r* and optical/electrical transducers $p^1$ and $q^1$ produce source pulse trains. The nature of the mechanical engagement represented by broken line *r* may such as is known, for example, in relation to the measurement of involute profile error or the measurement of lead error. The source pulse trains are brought into a theoretical one-to-one relationship, in this case by processing the pulses from transducer $q^1$ by means of a system *a*, *b* in accordance with the present invention, and then compared by means of a phase detector or comparator *s*. Error is proportional to phase difference and is printed out in the form of a trace by means of a recorder *t*.

Figure 4:
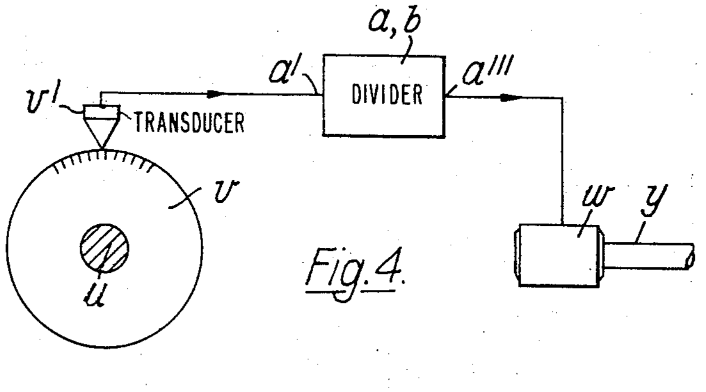
FIG. 4 is a schematic diagram of a variable-ratio transmission incorporating a digital processing system in accordance with th present invention.

In FIG. 4, an input shaft *u* carries a circular optical grating *v*. An optical/electrical transducer $v^1$ produces a source train of pulses whose count is proportional to the speed of rotation of shaft *u*. A digital processing system *a*, *b* in accordance with the present inventions provides an output train of pulses whose count bears a selected relationship with the source count, and a digital-to-analogue converter in the form of a servo-motor *w* drives an output shaft *y*. Thus, there is provided a variable ratio transmission capable of establishing, in practical terms, an almost unlimited number of reduction ratios to a high degree of accuracy.

In relation to all of the foregoing considerations, in cases where it is, for practical purposes necessary that "instantaneous" error be negligible, it will be appropriate, depending upon the nature of the selected number, to multiply both the source train of pulses and the selected number by the base or radix of the number system raised to a power such that the multiplied source count can still be handled within the frequency response of the hardware employed, and the integral portion of the multiplied selected number is large compared with the non-integral portion. For example, if a source count *x* is to be divided by a selected number such as, say 3.41268, and the frequency response of the hardware employed can handle *x* multiplied by $10^3$, then a 1,000-times multiplier would be interposed between the source pulses and the above described digital processing systems, and the selected number then used would be 3412.68. This technique is also appropriate in cases where it is desired to divide a source count by a selected number whose "integral" portion is zero.

We claim:

1. A digital processing system for dividing an average numerical count x of a source train of pulses by a number having an integral portion and a non-integral portion which number can be expressed as $A + B/r^1 + C/r^2 + \ldots$ etc., where A represents the said integral portion and B, C, . . . etc. represent separate digits and *r* is the base or radix of the number system; comprising a reversible counter having forward and reverse inputs and an output and adapted to pass one pulse to said output in response to A pulses applied to either of said inputs, and means defining a pulse feed-back path between said output and one of said inputs, said feed-back path means including counting means capable of passing to said one input B pulses in response to $r^1$ pulses appearing at said output + C pulses in response to $r^2$ pulses appearing at said output + . . . etc., whereby when a source train of pulses of count *x* is applied to the other of said inputs the average pulse count appearing at said output is the quotient obtained by dividing *x* by $A + B/r^1 + C/r^2 + \ldots$ etc.

2. A digital processing system according to claim 1, wherein said counting means comprises base or radix counters one for each of said digits, each base or radix counter having an input and an output and being adapted to pass one pulse to its output in response to *r* pulses applied to its input, the base or radix counters being arranged in cascade with respect to the output of the reversible counter, and gates one associated with each base or radix counter, each gate being adapted to monitor *r* different states in its associated base or radix counter and to pass to said one input of the reversible counter pulses in number equal to the value of the associated one of said digits during each cycle of *r* states in its associated base or radix counter.

3. A digital processing system according to claim 1, wherein the said counting means comprises a store register for storing the digits B, C . . . etc. of the said non-integral number portion, and an adding register having access to the store register and having an operating input connected with the output of the reversible counter and having an overflow output connected with the said one input of the reversible counter, the adding register being operative in response to each pulse appearing at the output of the reversible counter to add the contents of the store register to the instant contents of the adding register in accordance with the base or radix *r* of the number system and being adapted to pass a pulse from said overflow output to said one input of the reversible counter on the occurrence of each overflow in the adding register.

4. A digital processing system according to claim 1, including a device interposed between the counting means and the said one input of the reversible counter and adapted to convert simultaneously-occurring pulses from said counting means to sequentially-occurring pulses.

5. A digital processing system according to claim 1, wherein the pulses are electrical pulses, and the reversible counter and the counting means are adapted to handle electrical pulses.

6. A digital processing system according to claim 1 wherein the reversible counter and the counting means are adapted for use with a decimal number system.

7. A digital processing system according to claim 1, in combination with means capable of producing a source train of pulses.

8. A digital processing system according to claim 1 in combination with means capable of producing a source train of pulses, and means constituting a digital-to-analogue converter associated with the output of the reversible counter.

* * * * *